United States Patent [19]

Bauer et al.

[11] 4,348,204

[45] Sep. 7, 1982

[54] AQUEOUS DYESTUFF FORMULATION, A PROCESS FOR ITS PREPARATION AND ITS USE FOR DYEING AND PRINTING

[75] Inventors: Wolfgang Bauer, Maintal; Heinz Dickmanns, Frankfurt am Main; Konstantin Morgenroth, Maintal; Kuno Reh, Frankfurt am Main; Joachim Ribka, Offenbach-Bürgel, all of Fed. Rep. of Germany

[73] Assignee: Cassella Aktiengesellschaft, Frankfurt am Main, Fed. Rep. of Germany

[21] Appl. No.: 249,955

[22] Filed: Apr. 1, 1981

Related U.S. Application Data

[63] Continuation of Ser. No. 112,541, Jan. 16, 1980, abandoned.

[30] Foreign Application Priority Data

Jan. 19, 1979 [DE] Fed. Rep. of Germany ....... 2902034

[51] Int. Cl.$^3$ ...................... D06P 67/00; C09B 67/00
[52] U.S. Cl. ........................................... 8/527; 8/639; 8/641; 8/673; 8/918; 8/919
[58] Field of Search ........................... 8/639, 641-673, 8/527

[56] References Cited

U.S. PATENT DOCUMENTS

| | | | |
|---|---|---|---|
| 1,981,027 | 11/1934 | Briggs et al. | 8/529 |
| 2,489,463 | 11/1949 | Reynolds | 260/178 |
| 3,551,088 | 12/1970 | Kesler et al. | 8/587 |
| 3,957,425 | 5/1976 | Tullio | 8/681 |
| 4,118,182 | 10/1978 | Smith | 8/585 |

FOREIGN PATENT DOCUMENTS

| | | |
|---|---|---|
| 639436 | 10/1963 | Belgium . |
| 104102 | 7/1899 | Fed. Rep. of Germany . |
| 1297071 | 2/1970 | Fed. Rep. of Germany . |
| 882563 | 6/1943 | France . |

*Primary Examiner*—A. Lionel Clingman
*Attorney, Agent, or Firm*—Connolly and Hutz

[57] ABSTRACT

The aqueous dyestuff formulation of an tetrakisazo direct dyestuff which is stable to alkali and contains at least one aromatic hydroxyl group and/or enol group and at least one group conferring solubility in water, or a mixture of such azo direct dyestuffs, is characterized in that it has a pH value equal to or greater than 12 and is prepared by mixing an azo direct dyestuff which is stable to alkali, water and a tertiary alkali metal phosphate and/or alkali metal metasilicate and/or alkali metal hydroxide, and by choosing the proportions such that the dyestuff formulation contains 5 to 50% by weight of dyestuff and has a pH value equal to or greater than 12. The dyestuff formulation is used, after dilution with water, for dyeing and printing natural or synthetic materials containing hydroxyl groups.

8 Claims, No Drawings

AQUEOUS DYESTUFF FORMULATION, A PROCESS FOR ITS PREPARATION AND ITS USE FOR DYEING AND PRINTING

This application is a continuation of application Ser. No. 112,541 filed Jan. 16, 1980, now abandoned.

Substantive or direct dyestuffs of the azo series are used for dyeing and printing natural or synthetic fibre materials containing hydroxyl groups, such as, for example, cotton, regenerated cellulose or paper.

In the dyeing industry, large amounts of dyestuffs have to be prepared for the continuous dyeing procedure. There is thus a brisk demand for liquid dyestuff formulations. Because of the low solubility of substantive dyestuffs in water, this demand could not hitherto be satisfied, or could be satisfied only in particular cases.

It has now been found, surprisingly, that storable, mobile aqueous dyestuff formulations can easily be prepared if an azo direct dyestuff which is stable to alkali and contains at least one aromatic hydroxyl group and/or enol group and at least one group which confers solubility in water, or a mixture of such azo direct dyestuffs, is mixed with water and a pH value equal to or greater than 12 is established.

The invention thus relates to a storable, mobile aqueous dyestuff formulation of an azo direct dyestuff which is stable to alkali and contains at least one hydroxyl group and/or enol group and at least one group which confers solubility in water, and to a process for its preparation and to its use for dyeing and printing. The dyestuff formulation according to the invention can also contain a mixture of two or more azo direct dyestuffs. The dyestuff formulation according to the invention is characterised in that it has a pH value equal to or greater than 12.

Suitable azo direct dyestuffs which are stable to alkali can be metal-free or metal-containing monoazo, disazo, trisazo and polyazo dyestuffs which contain at least one, as a rule 1 to 4 and preferably 2 to 5, groups which confer solubility in water. Such groups which confer solubility in water are, in particular, carboxyl groups and/or sulpho groups, which are in general present in salt form, in particular in the form of the sodium salts. The aromatic hydroxyl groups are preferably those of the phenol and/or naphthol series. The strongly alkaline pH values equal to or greater than 12 in the dyestuff formulations according to the invention are established by means of tertiary alkali metal phosphates and/or alkali metal metasilicates and/or, preferably, alkali metal hydroxides. An example of a suitable tertiary alkali metal phosphate is tertiary sodium phosphate $Na_3PO_4.12H_2O$, or the corresponding tertiary potassium phosphate. An example of a suitable alkali metal metasilicate is so-called sodium monosilicate $Na_2SiO_3.4H_2O$ or $Na_2SiO_3.9H_2O$. Examples of suitable alkali metal hydroxides are lithium hydroxide and/or sodium hydroxide and/or potassium hydroxide, of which sodium hydroxide is preferred.

To prepare the dyestuff formulation according to the invention, the azo direct dyestuff, or a mixture of various azo direct dyestuffs, water and a tertiary alkali metal phosphate and/or alkali metal metasilicate and/or alkali metal hydroxide are mixed with one another until the dyestuff has dissolved. This mixing is effected at temperatures from room temperature up to about 50° C. Furthermore, other additives still to be mentioned (hydrotropic compounds, surface-active agents and buffers) can also be mixed in. A dyestuff powder is introduced into water, whilst stirring, the alkaline compounds establishing the pH value greater than 12 or the other additives being added to the water before, during or after the addition of the dyestuff. The amounts of water, dyestuff and alkaline compound establishing the pH value greater than 12 are chosen such that the finished dyestuff formulation contains 5 to 50% by weight, preferably 10 to 30% by weight, of dyestuff and has a pH value equal to or greater than 12, in particular from 12.5 to 13.1. It is also possible to use dyestuff pastes or press cakes from the manufacture of the dyestuffs as the starting materials in the preparation of the dyestuff formulation according to the invention. The water content of these products from the manufacture of the dyestuffs should accordingly be taken into consideration. When the dyestuff has dissolved, the formulation is cooled, if appropriate, to room temperature and is then a storable, mobile dyestuff formulation.

As already mentioned, hydrotropic compounds which are in themselves known, or mixtures thereof, for example from the series of hydrotropic salts, such as sodium benzoate, sodium benzenesulphonate, sodium p-toluenesulphonate and sodium N-benzylsulphanilate, can additionally be present in the dyestuff formulations according to the invention. Examples of further suitable hydrotropic compounds are: admidic compounds containing carbonyl groups, for example urea, formamide, dimethylformamide, acetamide, N-methylpyrrolidone and ε-caprolactam; and furthermore water-miscible monohydric or polyhydric alcohols, for example methanol, ethanol, n-propanol, isopropanol, ethylene glycol, diethylene glycol, triethylene glycol, polyethylene glycol, polypropylene glycol, polyvinyl alcohol, 1,2-propylene glycol, 1,3-propylene glycol, 2,3-butylene glycol, 1,4-butylene glycol, 2,2-diethylpropane-1,3-diol, 1,6-hexylene glycol, 3-methyl- and 2-methyl-1,6-hexylene glycol, 2-methyl-pentane-2,4-di-ol, 2-ethyl-hexane-1,3-diol, 2,2-dimethyl-hexane-1,3-diol, glycerol, pentaerythritol, mannitol, sorbitol and dextrin; and furthermore ethylene glycol alkyl ethers, diethylene glycol alkyl ethers, triethylene glycol alkyl ethers and polyethylene glycol alkyl ethers, in each case in particular with 1 to 4 C atoms in the alkyl radical.

Hydrotropic compounds are described, for example, by H. Rath and S. Müller, Melliand Textilberichte 40, 787 (1959), or by E. H. Daruwalla in K. Venkataraman, "The Chemistry of Synthetic Dyes", Volume VII, pages 86 to 92 (1974), and in the literature cited in this reference.

Preferred hydrotropic compounds which the dyestuff formulations according to the invention contain are diethylene glycol, triethylene glycol, ethylene glycol monoalkyl ethers, diethylene glycol monoalkyl ethers and triethylene glycol monoalkyl ethers with in each case 1-2 C atoms in the alkyl radical, urea, ε-amino-caproate (from ε-caprolactam) and mixtures thereof. The dyestuff formulations according to the invention usually contains 5-40% by weight, preferably 10 to 35% by weight, of one or more hydrotropic compounds.

A surface-active agent which is in itself known or a mixture of such surface-active agents can also additionally be present in the dyestuff formulations according to the invention. Possible surface-active agents of this type are anionic surface-active agents and/or amphoteric surface-active agents, and nonionic surface-active agents, such as are described, for example, in Ullmanns Enzyklopädie der Technischen Chemie (Ullmann's Encyclopaedia of Industrial Chemistry), 3rd edition, Volume 16, pages 724 to 748 (1965), by J. L. Moillet, B. Collie and W. Black in "Surface Chemistry", 2nd edition, Chapters 10 to 15, and by E. H. Daruwalla K. Venkataraman: "The Chemistry of Synthetic Dyes", Volume VII, pages 86–92 (1974).

The storage stability of the dyestuff formulation and the solubility of the dyestuff can be further improved by the additional content of a hydrotropic compound and/or of a surface-active agent.

The dyestuff formulations according to the invention can also contain substances which act as buffers in the strongly alkaline range, for example aminoalkanecarboxylic acids, such as aminoacetic acid, β-aminopropionic acid, γ-aminobutyric acid and ε-aminocaproic acid. The dyestuff formulations according to the invention can furthermore contain complexones, for example nitrilotriacetic acid or ethylenediamine-tetraacetic acid.

The dyestuff formulations according to the invention are mobile, storable, concentrated dyestuff solutions which have a pH value equal to or greater than 12 and are outstandingly suitable as writing fluids or for the preparation of dye liquors or printing pastes for dyeing and printing natural or synthetic fibre materials containing hydroxyl groups, in particular cotton, regenerated cellulose, paper and wood. The dye liquors prepared from these solutions are particularly suitable for completely continuous dyeing processes, for example the pad-steam process, but are also suitable for dyeing fibre materials containing hydroxyl groups by the exhaustion process, by the high temperature process and by semi-continuous dyeing processes, for example by the pad-jig, pad-roll and cold batch process.

For dyeing, the dyestuff formulations according to the invention need only to be further diluted with appropriate amounts of water in order to obtain a liquor which is ready for dyeing. For printing, printing thickeners which are in themselves known must also be added. The dye liquors and printing pastes obtainable in this manner have pH values equal to or greater than 11.5, preferably from 12 to 13.1.

In the case of completely continuous dyeing processes in particular, for example the pad-steam and pad-salt process, use of the dyestuff formulations according to the invention offers the surprising industrial advantage, compared with the use of the corresponding commercially available dyestuff powders or direct dyestuff solutions which do not have strongly alkaline pH values equal to or greater than 12, that considerably shorter fixing and steaming times are necessary to achieve optimum colour yields. Using dye liquors which have been prepared from the dyestuff formulations according to the invention, considerably more material can thus be dyed per unit time in a continuous dyeing process, with the same energy consumption, than when commercially available dyestuff powders are employed or when dyestuff solutions or direct dyestuffs which do not have alkaline pH values equal to or greater than 11.5 are used.

A further surprising industrial advantage is that the solubility at temperatures of $-10°$ C. to $+50°$ C. of metal-free or metal-containing azo direct dyestuffs containing hydroxyl groups and/or containing enol groups can in many cases be improved by a factor greater than 5 to 10 by establishing pH values equal to or greater than 12, so that those sparingly soluble direct dyestuffs of the disazo, trisazo and, above all, polyazo dyestuff series with a high molecular weight, from which no concentrated solutions could be obtained by the methods known hitherto for the preparation of liquid direct dyestuffs, can also be converted into concentrated aqueous mobile dyestuff formulations.

A further industrial advantage in the preparation of dyestuff formulations according to the invention is characterised in that the dyestuffs can be employed in the form of aqueous press cakes, such as are obtained in dyestuff manufacture, which still contain electrolytes arising from manufacture, such as sodium chloride, ammonium chloride, sodium bicarbonate and sodium carbonate, for example in amounts of 1 to 20%. For the preparation of the dyestuff formulations according to the invention, it is not necessary to separate off such electrolytes arising from manufacture.

The use of direct dyestuff solutions containing electrolytes even presents the advantage of a higher substantivity or colour yield, compared with electrolyte-free solutions of direct dyestuffs.

Those direct dyestuffs of the azo series which contain, for example, one or more radicals of the following dyestuff precursors containing hydroxyl groups are suitable for the preparation of the dyestuff formulations according to the invention: phenol, 2-methylphenol, 3-methylphenol, 4-methylphenol, 3-methoxyphenol, 2-hydroxybenzenesulphonic acid, 3-hydroxybenzenesulphonic acid, 4-hydroxybenzenesulphonic acid, 1,3-dihydroxybenzene, 1,3-dihydroxy-5-methylbenzene, 1,3-dihydroxybenzene-5-sulphonic acid, 1-amino-3-hydroxybenzene, 1-(2'-methylphenylamino)-3-hydroxybenzene, 1-(phenylamino)-3-hydroxybenzene, 3-aminophenol-4-sulphonic acid, 3-carboxymethylaminophenol, 2-hydroxybenzoic acid, 2-hydroxy-3-methylbenzoic acid, 2-hydroxy-4-methylbenzoic acid, 2-hydroxy-5-methylbenzoic acid, 2-hydroxy-5-sulphobenzoic acid, 2-hydroxy-5-aminobenzoic acid, 2-hydroxy-3-aminobenzoic acid, 1-hydroxynaphthalene, 1,6-dihydroxynaphthalene, 1-hydroxynaphthalene-4-sulphonic acid, 1-hydroxynaphthalene-3,6-disulphonic acid, 1-hydroxynaphthalene-5-, -6- and -7-sulphonic acid, 2-hydroxynaphthalene, 2-hydroxy-7-aminonaphthalene, 2-hydroxynaphthalene-3-carboxylic acid, 2-hydroxynaphthalene-3-carboxylic acid anilide, 2-hydroxynaphthalene-6-, -7- and -8-sulphonic acid, 2-hydroxynaphthalene-3,6-disulphonic acid, 2-hydroxynaphthalene-6,8-disulphonic acid, 1-hydroxynaphthalene-3,6,8-trisulphonic acid, 1-hydroxynaphthalene-3,8-disulphonic acid, 1-amino-8-hydroxynaphthalene-4-sulphonic acid, 1-amino-8-hydroxynaphthalene-3,6-disulphonic acid, 1-amino-8-hydroxynaphthalene-4,6-disulphonic acid, 1-amino-8-hydroxynaphthalene-2,4-disulphonic acid, 1-acetylamino-8-hydroxynaphthalene-3,6-disulphonic acid, 1-hydroxy-8-chloronaphthalene-3,6-disulphonic acid, 1-hydroxy-8-ethoxynaphthalene-3,6-disulphonic acid, 1,8-dihydroxynaphthalene-3,6-disulphonic acid, 1,8-dihydroxynaphthalene-4-sulphonic acid, 1,7-dihydroxynaphthalene-3-sulphonic acid, 2-amino-8-hydroxynaphthalene-6-sulphonic acid, 2-amino-8-hydroxynaphthalene-3,6-disulphonic acid, 2-methylamino-8-hydroxynaphthalene-6-sulphonic acid, 2-dimethylamino-8-hydroxynaphthalene-6-sulphonic acid, 2-carboxymethylamino-8-hydroxynaphthalene-6-sulphonic acid, 2-acetylamino-8-hydroxynaphthalene-6-sulphonic acid, 2-benzoylamino-8-hydroxynaphthalene-6-sulphonic acid, 2-phenylamino-8-hydroxynaphthalene-6-sulphonic acid, 3-amino-8-hydroxynaphthalene-6-sulphonic acid, 3-acetylamino-8-hydroxynaphthalene- 6-sulphonic acid, 3-carboxymethylamino-8-hydroxynaphthalene-6-sulphonic acid, 3-benzoylamino-8-hydroxynaphthalene-6-sulphonic acid, 3-phenylamino-8-hydroxynaphthalene-6-sulphonic acid, 6,6'-bis-(1-hydroxy-3-sulphonaphthyl)-urea (J-acid urea), 6,6'-bis-(1-hydroxy-3-sulphonaphthyl)-amine (J-acid imide), acetoacetic acid anilide, acetoacetic acid 2-methoxyanilide, acetoacetic acid 4-methoxyanilide, acetoacetic acid 3-sulphoanilide, acetoacetic acid 4-sulphoanilide, acetoacetic acid 4-carboxyanilide, acetoacetic acid 2-methoxy-4-sulphoanilide, acetoacetic acid 2-methoxy-5-methyl-4-sulphoanilide, acetoacetic acid 2,4-dimethoxy-5-sulphoanilide, acetoacetic acid 2,5-dimethoxy-4-sulphoanilide, acetoacetic acid naphthyl-1-amide, acetoacetic acid naphthyl-2-amide, acetoacetic acid 4-sulphonaphthyl-1-amide, acetoacetic acid 6-sulphonaphthyl-1-amide, acetoacetic acid 6-sulphonaphthyl-2-amide, 1-phenyl-3-methyl-pyrazol-5-one, 1-(4'-sulphophenyl)-3-methylpyrazol-5-one, 1-(2',5'-dichloro-4'-sulphophenyl)-3-methyl-pyrazol-5-one, 1-phenyl-pyrazol-5-one-3-carboxylic acid, 1-(4'-sulphophenyl)-pyrazol-5-one-3-carboxylic acid, 4-methyl-3-cyano-6-hydroxypyrid-2-one, 4-methyl-6-hydroxypyrid-2-one-3-sulphonic acid, 1,4-dimethyl-3-cyano-6-hydroxypyrid-2-one and 1,4-dimethyl-6-hydroxypyrid-2-one-3-sulphonic acid.

The following metal-free or metal-containing monoazo, disazo, trisazo and polyazo dyestuffs of the direct dyestuff series which contain hydroxyl groups and/or contain enol groups and are listed in the Colour Index are suitable, for example, for the preparation of the dyestuff formulations according to the invention: CI Direct Yellow 8, Yellow 22, Yellow 18, Yellow 27, Green 28, Red 48, Red 51, Red 47, Red 20, Red 3, Red 70, Brown 30, Yellow 14, Orange 17, Brown 80, Orange 18, Brown 18, Blue 84, Orange 31, Black 30, Violet 39, Violet 28, Blue 31, Blue 3, Blue 21, Blue 27, Blue 25, Blue 60, Blue 231, Blue 14, Blue 53, Violet 13, Green 57, Blue 8, Blue 35, Blue 36, Blue 9, Blue 12, Blue 50, Blue 65, Blue 22, Blue 45, Blue 10, Blue 152, Violet 37, Blue 4, Blue 15, Blue 23, Blue 1, Blue 215, Red 148, Yellow 15, Brown 148, Red 120, Violet 83, Yellow 26, Green 55, Red 101, Red 75, Violet 6, Violet 62, Red 181, Red 57, Red 6, Green 11, Red 16, Black 51, Violet 57, Blue 67, Blue 116, Red 189, Orange 5, Orange 90, Red 174, Yellow 33, Red 79, Red 31, Violet 14, Red 149, Orange 26, Orange 29, Orange 102, Red 23, Red 4, Red 14, Orange 108, Red 62, Red 73, Red 24, Red 26, Red 72, Red 54, Red 36, Green 20, Blue 39, Red 50, Black 241, Black 9, Black 2, Black 21, Black 80, Blue 33, Blue 157, Brown 52, Black 24, Blue 26, Blue 63, Blue 30, Blue 34, Black 48, Green 59, Green 26, Blue 82, Blue 148, Blue 186, Blue 71, Blue 72, Blue 74, Black 49, Black 56, Blue 239, Black 103, Black 74, Blue 78, Blue 70, Blue 69, Blue 81, Blue 75, Blue 83, Green 33, Orange 94, Black 19, Black 28, Black 22, Black 32, Blue 176, Blue 175, Blue 162, Blue 159, Red 80, Red 194, Red 32, Black 75, Black 38, Blue 2, Brown 95, Brown 2, Blue 6, Green 1 and Black 4.

Dyestuffs which contain hydroxyl group and are derived from 2-(4'-aminophenyl)-5-(or 6)-amino-benzimidazole are also suitable, for example those of the following formulae:

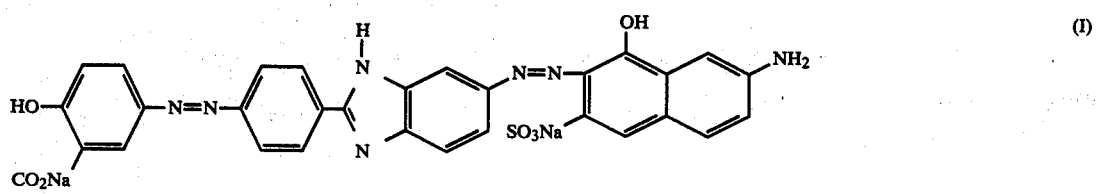

(I)

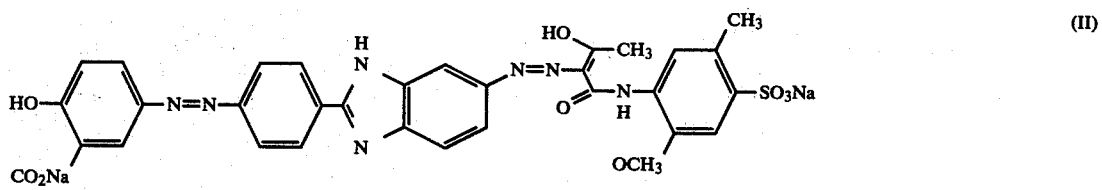

(II)

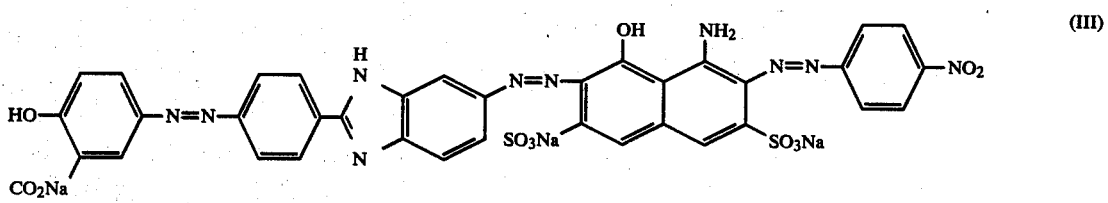

(III)

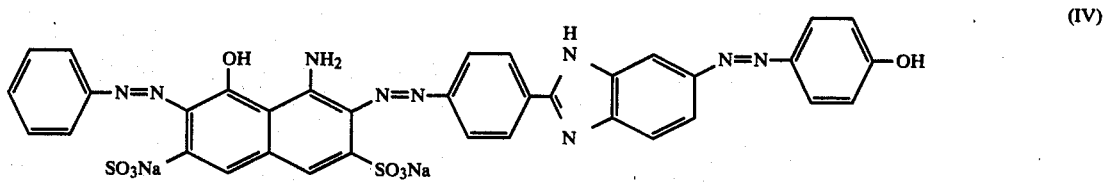

(IV)

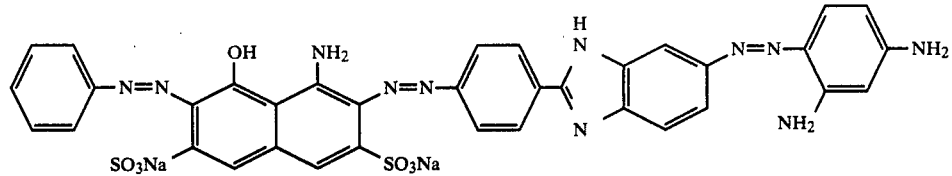 (V)
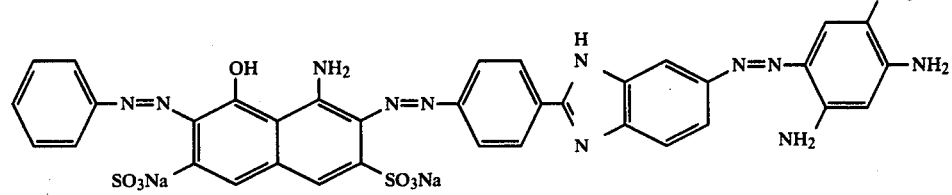 (VI)
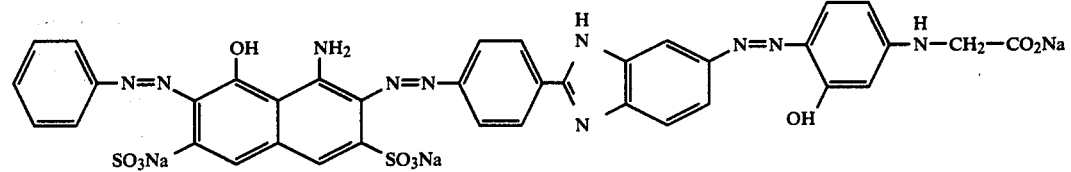 (VII)
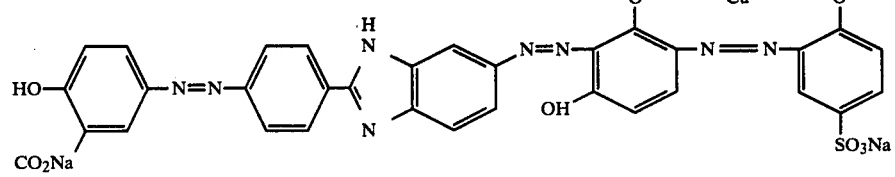 (VIII)
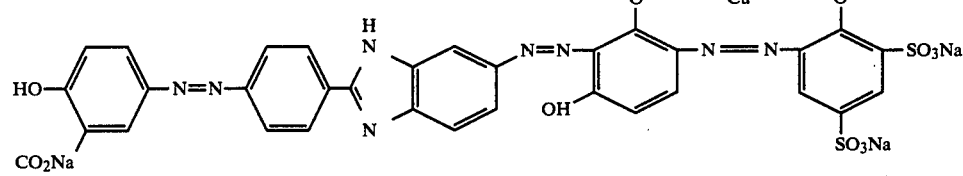 (IX)
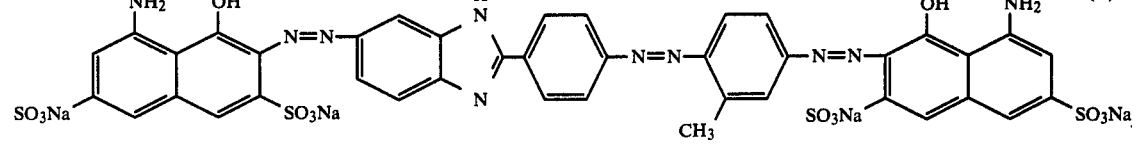 (X)
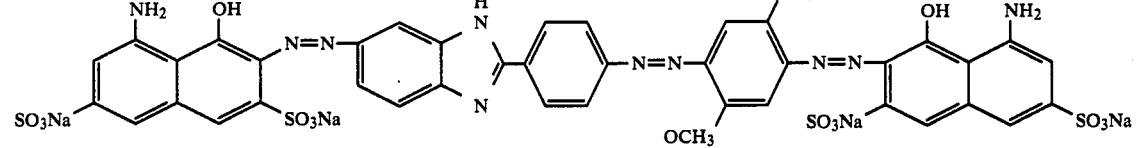 (XI)
as are azo dyestuffs which contain hydroxyl groups and are derived from 4,4'-diaminodiphenylamino-2-sulphonic acid, for example the dyestuff of the formula
Particularly suitable monoazo direct dyestuffs have one aromatic or enolic hydroxyl group and one or two groups conferring solubility in water. Very particularly
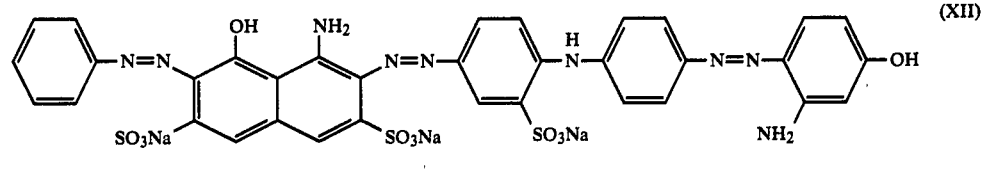 (XII)

suitable monoazo direct dyestuffs are those which contain a radical of the formula

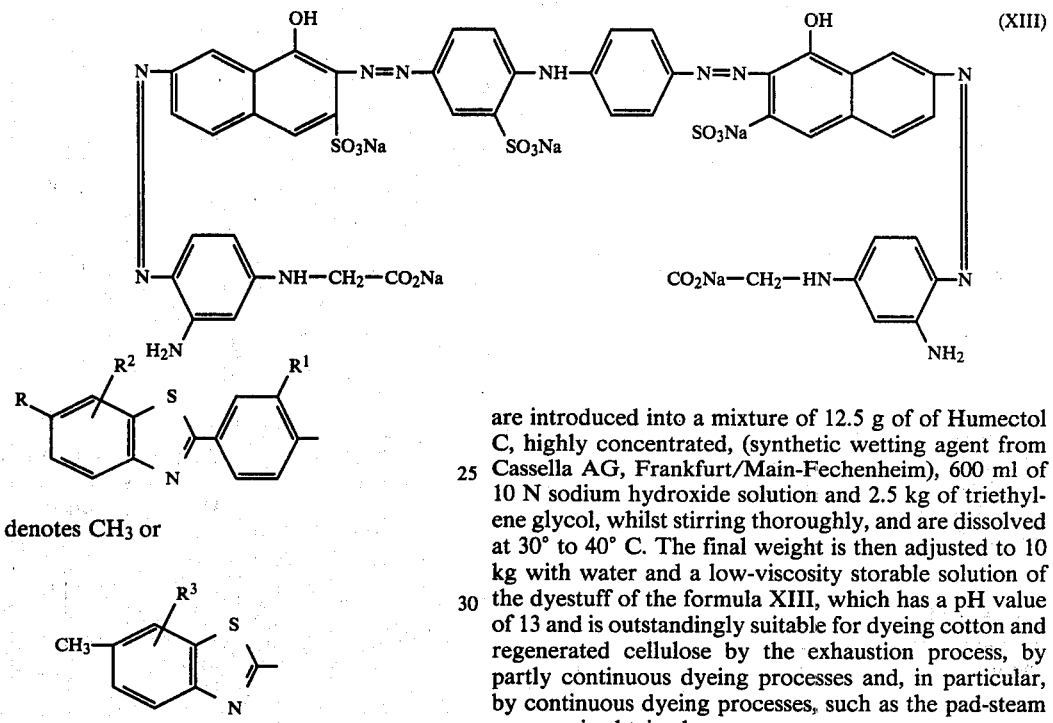

wherein R denotes CH₃ or and R¹, R² and R³ denote H or —SO₃H, and such a dyestuff contains, in total, one aromatic or enolic hydroxyl group and one or two groups conferring solubility in water.

Preferred disazo direct dyestuffs have at least two, in particular 2 to 4, aromatic and/or enolic hydroxyl groups and 2 to 4 groups which confer solubility in water. Preferred disazo dyestuffs are, for example, the following disazo dyestuffs of the direct dyestuff series, which are listed in the Colour Index: C.I. Direct Blue 1, Black 51, Blue 15, Blue 10, Blue 22, Blue 25, Blue 14, Blue 53, Red 23, Brown 2, Blue 2, Blue 6, Brown 80, Orange 18, Blue 84 and Red 79, and furthermore the dyestuff of the formula I and the dyestuff of Example 13.

Preferred trisazo direct dyestuffs have at least one, in particular one or two, aromatic and/or enolic hydroxyl group and 2 to 4, in particular 2 or 3, groups which confer solubility in water. Preferred trisazo dyestuffs are, for example, the following trisazo dyestuffs of the direct dyestuff series, which are listed in the Colour Index: C.I. Direct Black 38, Green 1, Black 4, Brown 95, Brown 52 and Green 20, and furthermore the dyestuffs of the formulae III to XII.

Preferred tetrakisazo direct dyestuffs have at least one, in particular 1 to 4, aromatic or enolic hydroxyl group and at least 2, in particular 2 to 5, groups which confer solubility in water. Preferred tetrakisazo direct dyestuffs are, for example, the following tetrakisazo dyestuffs of the direct dyestuff series, which are listed in the Colour Index: C.I. Direct Black 19, Black 28, Black 22, Black 32, Blue 175, Blue 176, Red 80 and Black 75 and the dyestuff given in Example 1 which follows.

EXAMPLE 1

5.67 kg of an aqueous 27% strength by weight press cake, containing about 4% by weight of sodium chloride, of the dyestuff of the formula XIII are introduced into a mixture of 12.5 g of of Humectol C, highly concentrated, (synthetic wetting agent from Cassella AG, Frankfurt/Main-Fechenheim), 600 ml of 10 N sodium hydroxide solution and 2.5 kg of triethylene glycol, whilst stirring thoroughly, and are dissolved at 30° to 40° C. The final weight is then adjusted to 10 kg with water and a low-viscosity storable solution of the dyestuff of the formula XIII, which has a pH value of 13 and is outstandingly suitable for dyeing cotton and regenerated cellulose by the exhaustion process, by partly continuous dyeing processes and, in particular, by continuous dyeing processes, such as the pad-steam process, is obtained.

The dyestuff formulation according to the invention is mobile (the flow time from a 4 mm DIN cup is 12 seconds) and stable on storage. In the example is repeated without the addition of the sodium hydroxide solution, only a gelatinous product which cannot be poured and in which the dyestuff is not completely dissolved is obtained.

If the procedure followed is as according to the statements of Example 1, but instead of 2.5 kg of triethylene glycol, the hydrotropic compounds, or mixtures thereof, indicated in Table I are used and pH values of 12.5 to 13 are established with 10 N sodium hydroxide solution, solutions of the tetrakisazo dyestuff of the formula XIII which have a low viscosity and are particularly suitable for continuous dyeing processes are likewise obtained.

TABLE I

| Example | Hydrotropic compound | pH value of the solution of the dyestuff (XIII) |
|---|---|---|
| 2 | 1.25 kg of diethylene glycol<br>1.25 kg of triethylene glycol | 13 |
| 3 | 0.5 kg of urea<br>2.0 kg of triethylene glycol | 12.9 |
| 4 | 1.8 kg of ε-caprolactam | 12.9 |
| 5 | 3 kg of ethylene glycol monoethyl ether | 12.6 |
| 6 | 3 kg of diethylene glycol monoethyl ether | 12.8 |
| 7 | 2.0 kg of triethylene glycol<br>0.5 kg of Polydiol 400 | 12.8 |
| 8 | 2 kg of triethylene glycol<br>0.5 kg of triethylene glycol monoethyl ether | 12.8 |

EXAMPLE 9

5.7 kg of an aqueous 27% strength by weight press cake, of low electrolyte content (NaCl content below 0.1% by weight), of the dyestuff of the formula

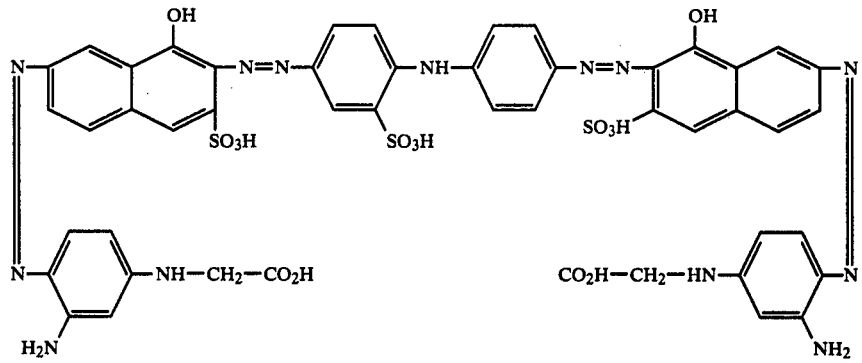

are dissolved in a mixture of 3 kg of diethylene glycol, 12.5 kg of Humectol C, highly concentrated, and 900 ml of 10 N sodium hydroxide solution. A low-viscosity storable solution of the dyestuff with a pH value of 13 is obtained.

EXAMPLE 10

65.8 g of a 23% strength by weight aqueous paste, containing about 4% by weight of sodium chloride, of the dyestuff CI Direct Black 22 are introduced into a thoroughly stirred mixture of 12 ml of 10 N sodium hydroxide solution, 0.25 g of Humectol C, highly concentrated, and 40 g of triethylene glycol and are dissolved at 30° to 50° C. A further 20 g of triethylene glycol are then added and the final weight is adjusted to 210 g with a little water. A solution of the dyestuff which has a pH value of 13.1 and is very suitable for dyeing cotton and regenerated cellulose by various dyeing processes, above all by the pad-steam and pad-salt process, is obtained.

EXAMPLE 11

70.4 g of an approximately 25% strength by weight aqueous filter cake, containing sodium chloride (about 4%), of the dyestuff DI Direct Black 32 are stirred in portions into a mixture of 12 ml of 10 N sodium hydroxide solution, 0.25 g of Humectol C, highly concentrated, and 40 g of triethylene glycol and are dissolved at 30° to 50° C. The final weight is then adjusted to 200 g with water and a mobile dyestuff solution of pH 12.8 which is outstandingly suitable for dyeing cotton and regenerated cellulose by various dyeing processes is obtained.

EXAMPLE 12

600 g of a 20% strength by weight aqueous press cake (containing sodium chloride as a result of the manufacturing process) of the dyestuff CI Direct Blue 1 are introduced into a mixture of 300 g of diethylene glycol and 60 ml of 10 N sodium hydroxide solution and are dissolved at 20° to 30° C. A storable solution of the dyestuff which has a pH value of 12.9 and a low viscosity and is very suitable for dyeing cotton, regenerated cellulose and paper is obtained.

EXAMPLE 13

84.4 g of a 33% strength by weight aqueous paste of the dyestuff of the formula

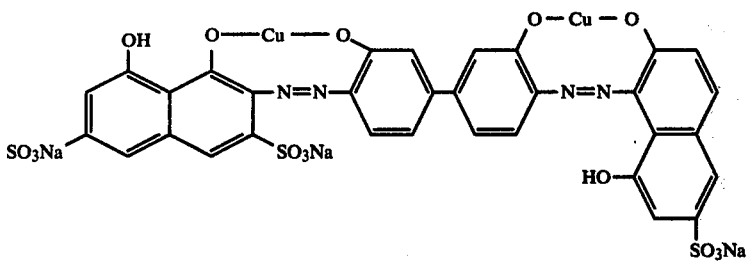

are dissolved in a mixture of 60 g of triethylene glycol and 18 ml of 10 N sodium hydroxide solution at pH 12.9. A further 40 g of triethylene glycol are then added. The solution of the dyestuff is very suitable for dyeing cotton and regenerated cellulose, above all by continuous processes.

EXAMPLE 14

266 g of an aqueous, approximately 40% strength by weight press cake of the dyestuff CI Direct Black 51 are dissolved in a mixture of 300 g of triethylene glycol, 1.2 g of Humectol C, highly concentrated, and 180 ml of 10 N sodium hydroxide solution at pH 12.8, whilst stirring thoroughly. The resulting dyestuff solution is outstandingly suitable for dyeing cotton and regenerated cellulose in black colour shades, above all by partly continuous and completely continuous dyeing processes.

EXAMPLE 15

100.2 g of a 25.5% strength by weight aqueous paste, containing sodium chloride, of the brown direct dyestuff of the formula

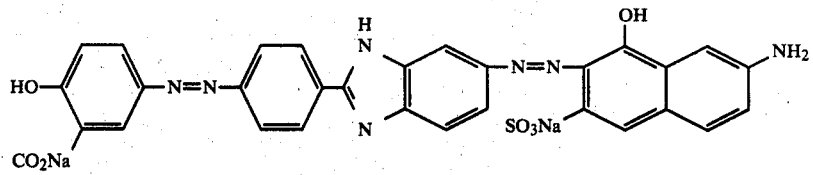

are dissolved in 60 g of triethylene glycol and 15 ml of 10 N sodium hydroxide solution at pH 12.6. The final weight is adjusted to 200 g with water and small amounts of impurities are removed by filtration. The solution of the disazo dyestuff is outstandingly suitable for dyeing cellulose fibres, above all cotton, regenerated cellulose and paper, by partly continuous and completely continuous dyeing processes.

EXAMPLE 16

1 kg of an aqueous 27% strength by weight press cake of the copper-containing direct dyestuff of the formula

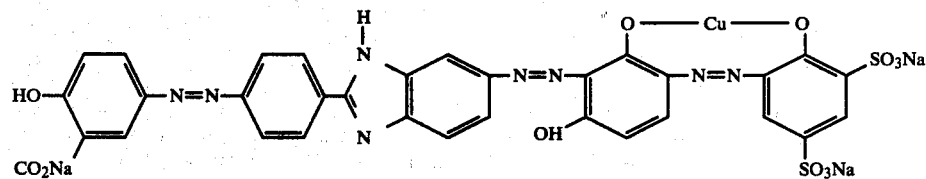

is dissolved in a mixture of 600 g of diethylene glycol and 120 ml of 10 N sodium hydroxide solution at about 40° C. The solution of the dyestuff of the above formula has a pH value of 12.5, coupled with a low viscosity, and is outstandingly suitable for dyeing cellulose fibres in brown colour shades which are fast to light, by partly continuous and completely continuous dyeing processes.

EXAMPLE 17

1.1 kg of an aqueous, 25% strength by weight paste of the direct dyestuff of the formula

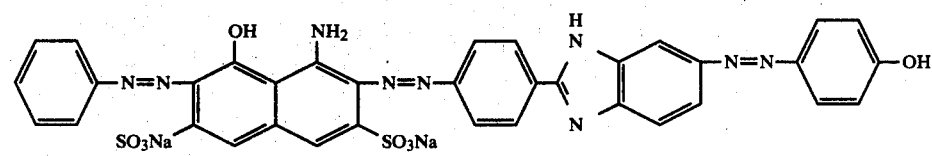

are dissolved in 600 g of triethylene glycol, 120 ml of 10 N sodium hydroxide solution and 2.5 g of Humectol C, highly concentrated, at pH 12.7, whilst stirring.

The alkaline solution of the green trisazo dyestuff is very suitable for dyeing cellulose fibres by various dyeing processes.

EXAMPLE 18

If the procedure followed is as according to the statements of Example 17, but 1 kg of a 25% strength by weight aqueous paste of a mixture of the black trisazo dyestuffs of the formulae

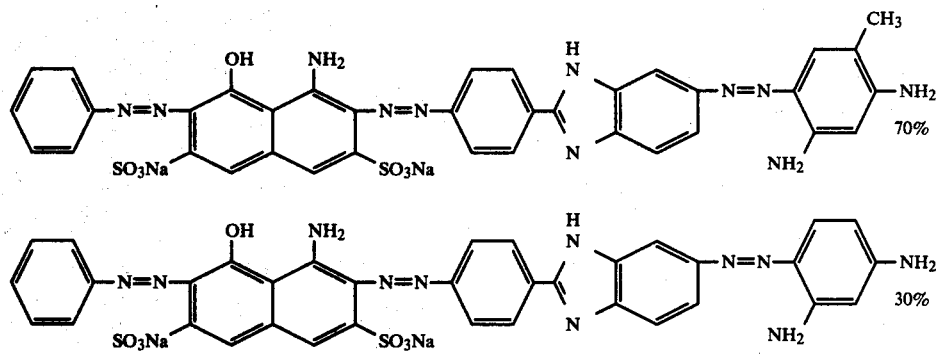

in the molar ratio indicated is employed, a solution of this trisazo dyestuff mixture which is suitable for dyeing cotton and regenerated cellulose in deep black colour shades by partly continuous and completely continuous dyeing processes is obtained.

EXAMPLE 19

30 g of an aqueous, approximately 35% strength by weight paste of the red direct dyestuff CI Direct Red 80 are dissolved in a mixture of 30 g of triethylene glycol and 18 ml of 10 N sodium hydroxide solution at pH 12.9. The dyestuff solution is very suitable for dyeing cellulose fibres in red colour shades by partly continuous and completely continuous dyeing processes.

EXAMPLE 20

53.5 g of a 35% strength by weight aqueous filter cake, containing about 3% by weight of sodium chloride, of the yellow direct dyestuff of the formula

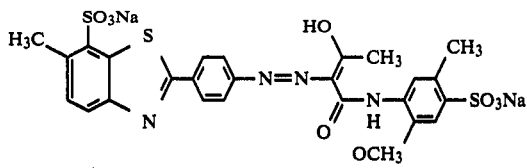

are introduced into a mixture of 25 g of caprolactam in 15 ml of water and are dissolved at pH 12.7 with 15 ml of 10 N sodium hydroxide solution.

The final weight is then adjusted to 120 g with water and small amounts of undissolved impurities are removed by filtration. A yellow dyestuff solution which is outstandingly suitable for dyeing cellulose fibres by the exhaustion process and by partly continuous and completely continuous dyeing processes is obtained.

EXAMPLE 21

120 g of an aqueous 25% strength by weight press cake, containing sodium chloride, of the dyestuff CI Direct Black 19 are dissoved in a mixture of 60 g of triethylene glycol and 12 ml of 10 N sodium hydroxide solution at pH 12.6. A mobile solution of the dyestuff which is outstandingly suitable for dyeing cellulose fibres, above all by continuous dyeing processes, is obtained.

EXAMPLE 22

865 ml of water are added to 135 g of the dyestuff formulation prepared according to Example 1. The padding liquor thus prepared, which has a pH value of 12.5, is transferred to a padding trough. Cotton piece goods are then padded with the padding liquor at a temperature of 20° to 25° C. (liquor pick-up: 80%). After the padding pass, the dyestuff applied to the cotton fabric is fixed for one minute by the action of saturated steam at 103° to 105° C. in a continuous unit.

If a padding liquor consisting of a solution of 45 g of a commercially available 46% strength by weight dyestuff powder of the formula XIII in 1 l of water is used in this continuous dyeing process, a significantly longer fixing time, that is to say a steaming time of 3 minutes, is required in order to obtain a black dyeing of the same depth of colour.

The dyestuff formulations of Examples 2 to 21 can be utilised in a similar manner for dyeing, being appropriately diluted for the preparation of the dye liquors or padding liquors and giving dye liquors or padding liquors with a pH value equal to or greater than 11.5.

We claim:

1. Aqueous dyestuff solution of a tetrakisazo direct dyestuff which is stable to alkali and contains at least one aromatic hydroxyl or enol group and at least two groups conferring solubility in water, or a mixture of such azo direct dyestuffs, said solution having a pH value of at least 12, and a dyestuff concentration of 5 to 50% by weight.

2. Dyestuff solution according to claim 1, wherein the tetrakisazo direct dyestuff contains 1 to 4 aromatic hydroxyl or enol groups and 2 to 5 groups conferring solubility in water.

3. Dyestuff solution according to either claim 1 or 2 wherein said solution has a dyestuff concentration of 10 to 30% by weight.

4. Dyestuff solution according to claim 1 which contains 5 to 40% by weight of a hydrotropic compound or of a mixture of hydrotropic compounds.

5. Dyestuff solution according to claim 1 wherein tetrakisazo dyestuff is

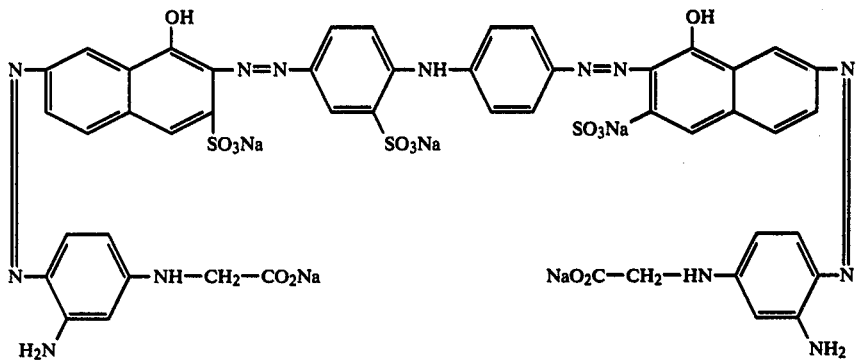

6. Dyestuff solution according to claim 1 which contains the dyestuff C.I. Direct Black 22, C.I. Direct Black 32 or C.I. Direct Black 19.

7. The process for preparing the dyestuff solution according to claim 1 comprising mixing (a) a tetrakisazo dyestuff having at least one aromatic hydroxyl or enol group and at least 2 groups conferring solubility in water, (b) water, and (c) a member selected from the group of tertiary alkali metal phosphate, alkali metal metasilicate, alkali metal hydroxide and mixtures thereof;

with the quantitative proportions of (a), (b) and (c) chosen such that the dyestuff formulation contains 10 to 50% by weight of dyestuff and has a pH of at least 12.

8. In the process of dyeing and printing natural or synthetic materials containing hydroxyl groups according to the pad-steam process with an aqueous dyestuff solution, the improvement comprises said dyestuff solution being a solution according to claim 1.

* * * * *